United States Patent Office.

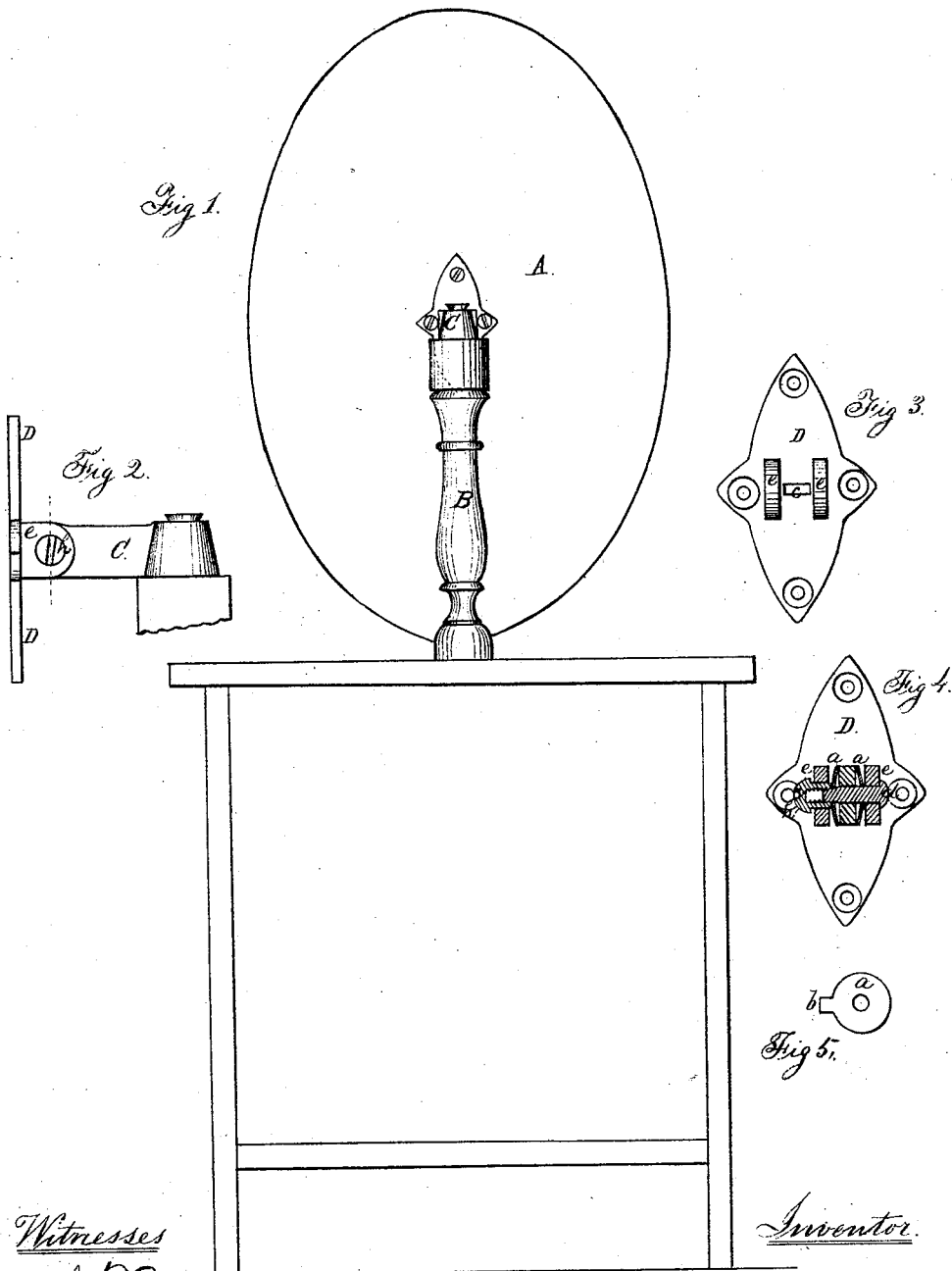

W. HASKELL KING, OF NEWARK, NEW JERSEY, ASSIGNOR TO EDWARD P. WILLIAMS, OF ELIZABETH, NEW JERSEY, AND GEORGE H. CHINNOCK, OF NEW YORK CITY.

Letters Patent No. 101,022, dated March 22, 1870.

IMPROVED TOILET-MIRROR.

The Schedule referred to in these Letters Patent and making part of the same.

*To all whom it may concern:*

Be it known that I, W. HASKELL KING, of the city of Newark and State of New Jersey, have invented a new and useful Improvement in Adjustable Toilet-Mirrors; and I do hereby declare that the following is a full, clear, and exact description of the construction and operation of the same, reference being had to the accompanying drawings making a part of this specification, in which—

Figure 1 is a back view of the mirror; also of a bureau to which the post supporting the mirror is attached.

Figures 2, 3, and 4 are views in detail of the devices by which the mirror is made adjustable.

Like letters in the different figures of the drawings indicate like parts.

My invention relates to the class of adjustable toilet-mirrors in which an arm, having a swivel motion on the post of a stand, is used, in combination with an angular or flat spring attached to the back of the mirror, for the purpose of enabling the mirror to be held, when adjusted, to the position desired, by the friction of the spring pressing upon the end or sides of the arm, and consists of concave or disk springs, with a pivot and set-screw, so combined and arranged with the sides of said arm and the ears or projections of a plate attached to the back of the mirror, as to impart the required pressure or friction more advantageously, the said screws forming the connection of the arm and springs with the ears or projections, and at the same time enabling the pressure or friction to be increased at any time to compensate for any looseness that may be produced from the wear of the spring.

To enable others skilled in the art to make and use my invention, I will proceed to describe its construction and operation.

A is the mirror.

B is the post, represented as being attached to the top of a bureau.

C is the arm, pivoted to the top of the post.

The concave springs, or what might be termed disk or cymbal springs $a\ a$, have projections $b$, which fit in the slot $c$ of the plate D, so as to permit of their turning only with the mirror, and have, also, holes through the center of them for the admission of the pivot-screw $d$.

The plate D is attached centrally to the back of the mirror by screws, and is provided with ears or projections $e\ e$, which have holes through them to receive the pivot and set-screws $d\ h$.

The set-screw $h$ is made hollow through one end, and provided with female-screw threads on the interior thereof, so as to fit and screw on the end of the pivot-screw.

In attaching the arm C to the ears or projections $e\ e$, the concave springs $a\ a$ are placed one on each side of the arm, with the convex side out, (see fig. 4.) The arm and springs are then inserted between the ears or projections $e\ e$ with the projections $b$ of the springs in the slot $c$ of plate D.

The pivot-screw $d$ is then introduced through the hole of the ear or projection at one side, and the set-screw $h$ through the hole of the ear or projection at the opposite side, the latter screw being turned until it screws on to the end of the pivot-screw $d$, when the springs will be drawn tightly upon the sides of the arm. Thus the friction from the pressing of the springs thereupon will hold the mirror at any angle or position desired, which pressure will be maintained during the use of the mirror, no further adjustment of the set-screw being required unless by any possibility the springs should wear loose, when, as will be obvious, this may be easily compensated by tightening the set-screw.

Claim.

Having thus fully described my invention,

What I claim therein as new, and desire to secure by Letters Patent, is—

The combination of concave or disk springs $a$, pivot and set-screws $d\ h$, with either a fixed or movable arm, C, and ears or projections $e$, substantially as and for the purpose set forth.

As evidence that I claim the foregoing as my invention, I have hereunto set my hand and seal in the presence of two witnesses.

W. HASKELL KING. [L. S.]

Witnesses:
WILLIAM A. THOMAS,
JAMES A. HEDDEN.